(12) United States Patent
Fu et al.

(10) Patent No.: US 10,253,423 B2
(45) Date of Patent: Apr. 9, 2019

(54) METHOD FOR MAKING THREE-DIMENSIONAL POROUS COMPOSITE STRUCTURE

(71) Applicants: Tsinghua University, Beijing (CN); HON HAI PRECISION INDUSTRY CO., LTD., New Taipei (TW)

(72) Inventors: Hong-Ying Fu, Beijing (CN); Wen-Zhen Li, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/792,791

(22) Filed: Oct. 25, 2017

(65) Prior Publication Data
US 2018/0319664 A1 Nov. 8, 2018

(30) Foreign Application Priority Data
May 8, 2017 (CN) .......................... 2017 1 0317874

(51) Int. Cl.
| | |
|---|---|
| *B32B 9/00* | (2006.01) |
| *C23F 1/16* | (2006.01) |
| *C25D 3/20* | (2006.01) |
| *C25D 3/22* | (2006.01) |
| *C25D 3/30* | (2006.01) |

(Continued)

(52) U.S. Cl.
CPC .............. *C25D 5/48* (2013.01); *B32B 9/007* (2013.01); *B32B 15/043* (2013.01); *B82Y 40/00* (2013.01); *C01B 32/158* (2017.08); *C01B 32/168* (2017.08); *C23F 1/16* (2013.01); *C25D 5/10* (2013.01); *C25D 5/54* (2013.01); *B32B 2260/02* (2013.01); *B32B 2305/026* (2013.01); *C01B 2202/08* (2013.01); *C25D 3/20* (2013.01); *C25D 3/22* (2013.01); *C25D 3/30* (2013.01);

(Continued)

(58) Field of Classification Search
CPC ... B32B 9/007; B32B 15/043; B32B 2260/02; B32B 2305/026; B82Y 40/00; C01B 32/158; C01B 32/168; C01B 2202/08; C23F 1/16; C25D 3/20; C25D 3/22; C25D 3/30; C25D 3/44; C25D 3/46; C25D 3/48; C25D 3/50; C25D 5/10; C25D 5/45; C25D 5/54

See application file for complete search history.

(56) References Cited

U.S. PATENT DOCUMENTS 9,011,706 B2 * 4/2015 Li ...................... B82Y 20/00
205/102
2010/0323518 A1 * 12/2010 Oppermann ......... C25D 5/022
438/654

(Continued)

FOREIGN PATENT DOCUMENTS

| CN | 106611627 A | 5/2017 |
|---|---|---|
| TW | 201704148 A | 2/2017 |

*Primary Examiner* — Louis J Rufo
(74) *Attorney, Agent, or Firm* — ScienBiziP, P.C.

(57) ABSTRACT

A three-dimensional porous composite structure comprises a porous structure and at least one carbon nanotube structure. The porous structure has a plurality of metal ligaments and a plurality of pores. The at least one carbon nanotube structure is embedded in the porous structure and comprising a plurality of carbon nanotubes joined end to end by van der Waals attractive force, wherein the plurality of carbon nanotubes are arranged along a same direction.

13 Claims, 8 Drawing Sheets

(51) Int. Cl.
*C25D 3/44* (2006.01)
*C25D 3/46* (2006.01)
*C25D 3/48* (2006.01)
*C25D 3/50* (2006.01)
*C25D 5/10* (2006.01)
*C25D 5/48* (2006.01)
*C25D 5/54* (2006.01)
*B32B 15/04* (2006.01)
*B82Y 40/00* (2011.01)
*C01B 32/158* (2017.01)
*C01B 32/168* (2017.01)

(52) U.S. Cl.
CPC ............... *C25D 3/44* (2013.01); *C25D 3/46* (2013.01); *C25D 3/48* (2013.01); *C25D 3/50* (2013.01)

(56) References Cited

U.S. PATENT DOCUMENTS

| | | | |
|---|---|---|---|
| 2011/0033692 A1* | 2/2011 | Heinrichsdorff | C22C 26/00 428/222 |
| 2014/0268490 A1* | 9/2014 | Tsai | H01G 4/01 361/305 |
| 2016/0358747 A1* | 12/2016 | Zhu | G03F 7/0002 |
| 2018/0183041 A1 | 6/2018 | Tour et al. | |

* cited by examiner

METHOD FOR MAKING THREE-DIMENSIONAL POROUS COMPOSITE STRUCTURE

CROSS-REFERENCE TO RELATED APPLICATIONS

This application claims all benefits accruing under 35 U.S.C. § 119 from China Patent Application No. 201710317874.3, filed to May 8, 2017 in the China Intellectual Property Office, the disclosure of which is incorporated herein by reference. The application is also related to copending U.S. applications entitled, "THREE-DIMENSIONAL POROUS COMPOSITE STRUCTURE", Ser. No. 15/792,790 filed Oct. 25, 2017; "ANODE OF LITHIIUM ION BATTERY AND LITHIUM ION BATTERY USING THE SAME", Ser. No. 15/792,792 filed Oct. 25, 2017; "FUEL CELL ELECTRODE AND FUEL CELL USING THE SAME", Ser. No. 15/792,793 filed Oct. 25, 2017; and "BIOSENSOR ELECTRODE AND BIO SENSOR USING THE SAME", Ser. No. 15/792,795 filed Oct. 25, 2017.

FIELD

The subject matter herein generally relates to a method for making three-dimensional porous composite structure.

BACKGROUND

Nanoporous metal materials not only have high specific surface area, specific modulus and other characteristics, but also have a high thermal conductivity, high conductivity and other characteristics of metal materials, and have been widely used in a plurality of fields such as catalysis, energy storage and transformation, biosensor, molecular detection, silence vibration, shielding, heat exchange, electrochemistry.

In general, the nanoporous metal materials are often used in form of a nanoporous metal composite. However, the nanoporous metal materials are composited with other materials by a binder, which increases internal resistance of the nanoporous metal composite. Further, the nanoporous metal materials are very fragile. Therefore, a conductivity of the nanoporous metal composite is low, and a strength of the nanoporous metal composite is poor, which limit the application of the nanoporous metal composite.

What is needed, therefore, is to provide a method for making three-dimensional porous composite structure which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 4b is a Scanning Electron Microscope (SEM) image of cross-section of the three-dimensional porous composite structure in FIG. 4a.

DETAILED DESCRIPTION

Figure 1:
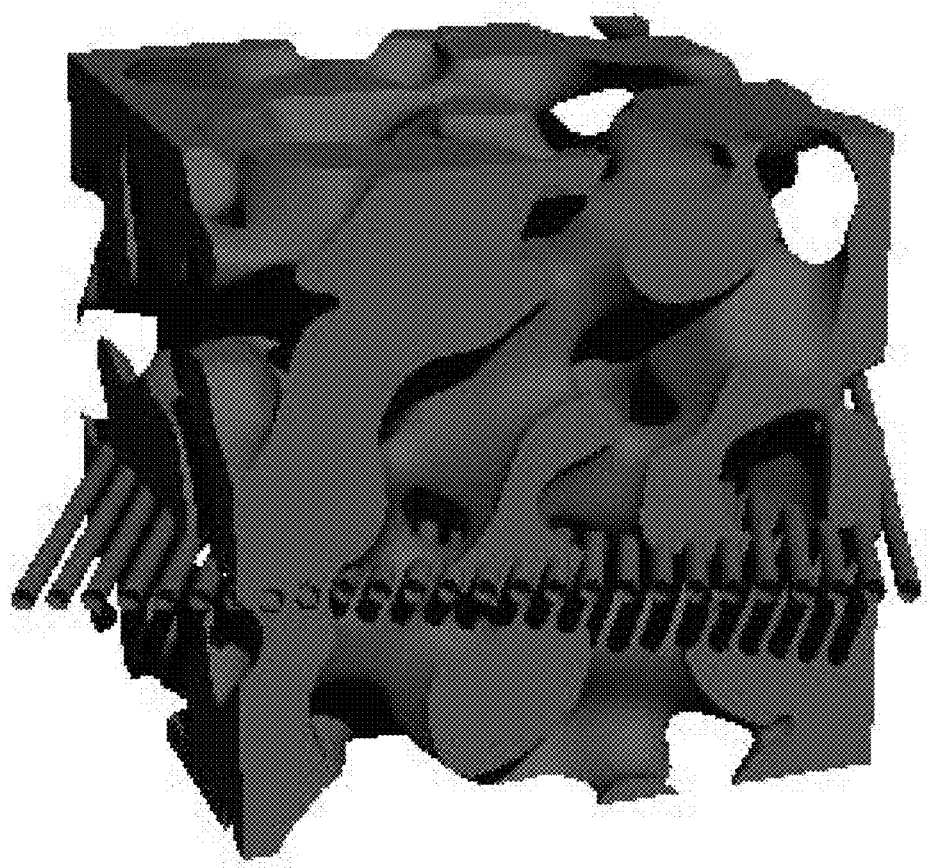
FIG. 1 is a schematic view according to one embodiment of the three-dimensional porous composite structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape or other word that substantially modifies, such that the component need not be exact. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

The present disclosure relates to a three-dimensional porous composite structure described in detail as below.

Figure 2:
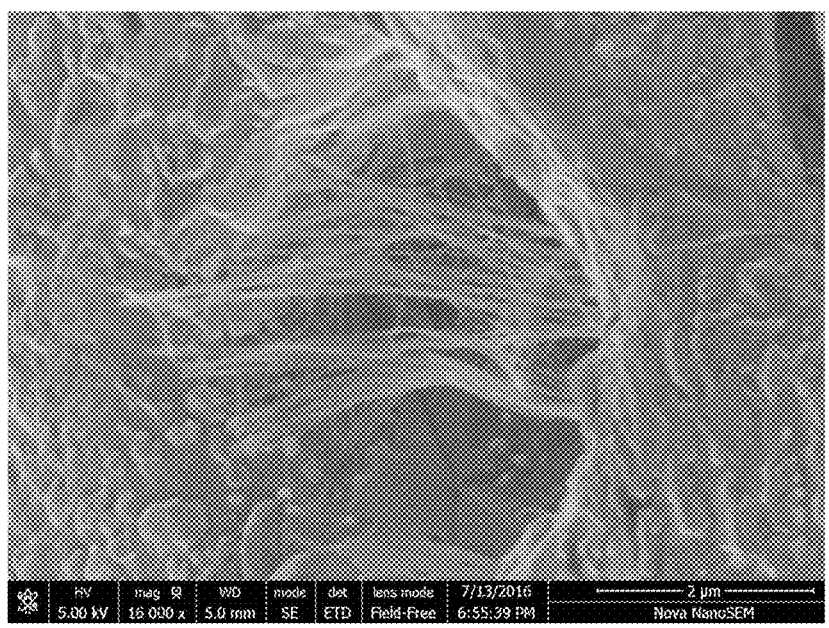
FIG. 2 is a Scanning Electron Microscope (SEM) image of a plurality of carbon nanotubes locating in a pore in the three-dimensional porous composite structure.

Referring to FIG. 1 and FIG. 2, a three-dimensional porous composite structure according to one embodiment is provided. The three-dimensional porous composite structure is a three-dimensional network structure. The three-dimensional porous composite structure includes a porous structure and at least one carbon nanotube structure. The at least one carbon nanotube structure is embedded in the porous structure.

The porous structure includes a plurality of metal ligaments. The plurality of metal ligaments define a plurality of pores. Each of the plurality of pores is formed by adjacent metal ligaments. The plurality of pores can be regularly distributed or irregularly distributed. Size of the plurality of pores are less than or equal to 100 micrometers. The metal ligaments can be made of inert metal materials. Examples of the inert metal materials comprise copper (Cu), silver (Ag), platinum (Pt) and aurum (Au).

The carbon nanotube structure includes a plurality of carbon nanotubes combined by van der Waals force therebetween. The carbon nanotube structure has good mechanical strength, toughness and conductivity. The carbon nanotube structure further includes a plurality of micropores. The plurality of micropores can be defined by adjacent carbon nanotubes in the carbon nanotube structure.

When the three-dimensional porous composite structure includes a plurality of carbon nanotube structures, the plurality of carbon nanotube structures can be spaced from each other. An angle θ between carbon nanotubes in adjacent spaced carbon nanotube structures can be ranged from 0° to 90°.

The carbon nanotube structure can be an ordered carbon nanotube structure. The term 'ordered carbon nanotube structure' refers to a structure where the carbon nanotubes are arranged in a consistently systematic manner, e.g., the carbon nanotubes are arranged approximately along a same direction. The carbon nanotube structure includes at least one carbon nanotube film. The carbon nanotube film can be a drawn carbon nanotube film.

The drawn carbon nanotube film includes a plurality of successive and oriented carbon nanotube segments joined end-to-end by van der Waals force therebetween. The drawn carbon nanotube film is a free-standing film. The drawn carbon nanotube film can be obtained by drawing from a carbon nanotube array substantially along a same direction. The carbon nanotube film has good mechanical strength, toughness and conductivity.

If the carbon nanotube structure includes a plurality of carbon nanotube films, the plurality of carbon nanotube films can be coplanar or stacked. An angle a between carbon nanotubes in adjacent stacked carbon nanotube films can be ranged from 0° to 90°.

The at least one carbon nanotube film are embedded in the porous structure. One part of the carbon nanotubes in the carbon nanotube film are embedded in the metal ligament, and another part of the carbon nanotubes in the carbon nanotube film are located in the plurality of pores, and/or the others part of the carbon nanotubes in the carbon nanotube film are exposed from surface of the porous structure.

The three-dimensional porous composite structure has the following advantages: the carbon nanotube structure is embedded in the porous structure, the three-dimensional porous composite structure has good electrical conductivity, toughness and stability; and has a large specific surface area; the carbon nanotubes as a strengthen structure are embedded in the metal ligament to make the porous structure strong.

Figure 3:
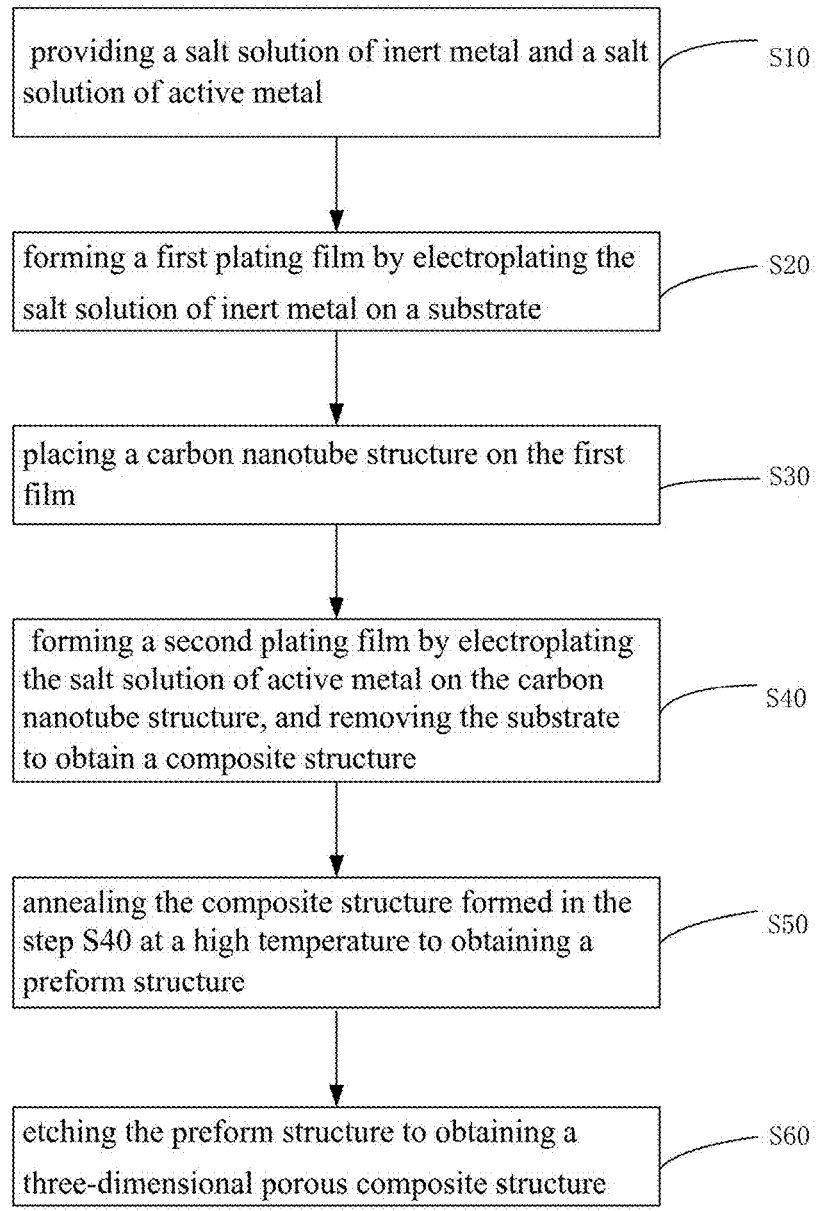
FIG. 3 is a flow chart of a method for making the three-dimensional porous composite structure.

Referring to FIG. 3, one embodiment of a method for making the three-dimensional porous composite structure comprising the following steps:

S10, providing a salt solution of inert metal and a salt solution of active metal;

S20, forming a first plating film by electroplating the salt solution of inert metal on a substrate;

S30, placing a carbon nanotube structure on the first plating film;

S40, forming a second plating film by electroplating the salt solution of active metal on the carbon nanotube structure; and removing the substrate to obtain a composite structure;

S50, annealing the composite structure formed in the step S40 at a high temperature to obtain a preform structure;

S60, etching the preform structure to obtain a three-dimensional porous composite structure.

In step S10, the inert metal material can be selected from a group comprising copper (Cu), silver (Ag), platinum (Pt) and gold (Au). The active metal material can be selected from magnesium (Mg), aluminum (Al), zinc (Zn), iron (Fe), tin (Sn) and nickel (Ni). Compared with the inert metal, the active metal is very easy to react with acid and alkali solution. Further, the salt solution of inert metal is sufficiently mixed with glucose, which can refine the following the first plating film. In one embodiment, the salt solution of inert metal is $ZnSO_4$, the salt solution of active metal is $CuSO_4$.

In step S20, the substrate can be made of pure metal material or metal alloy. The metal material or the metal alloy is not limited. Examples of the metal material can be titanium (Ti), silver (Ag), platinum (Pt) and aurum (Au). A method for forming the first plating film includes the following sub-steps:

S21, providing an inert metal plate used as a counter electrode, and using the substrate as a working electrode;

S22, providing a certain voltage between the substrate and the inert metal plate to form the first plating film.

In step (S21), the inert metal plate can be made of inert metal materials.

In step (S22), inert metal ions in the salt solution of inert metal get electrons to form metal atoms, and the metal atoms are deposited on surface of the substrate to form the first plating film. The first plating film is located on surface of the substrate.

In step S30, the carbon nanotube structure includes at least one carbon nanotube film. The at least one carbon nanotube film is sequentially laid on the first plating film. The carbon nanotube film includes a plurality of successive and oriented carbon nanotubes joined end-to-end by van der Waals force therebetween. When the carbon nanotube structure includes a plurality of carbon nanotube films, the plurality of carbon nanotube films can be coplanar or stacked. Adjacent carbon nanotube films are set at a certain angle.

A method for obtaining the carbon nanotube film is not limited. In one embodiment, a method of making the carbon nanotube film includes the steps of:

S31: providing an array of carbon nanotubes; and

S32: pulling out at least one carbon nanotube film from the carbon nanotube array.

In step S31, the carbon nanotube array is grown on a growing substrate by chemical vapor deposition. The carbon nanotube array includes a plurality of carbon nanotubes. The carbon nanotubes in the carbon nanotube array are substantially parallel with each other and perpendicular to the growing substrate.

In step S32, the carbon nanotube film can be drawn by the steps of:

S32a: selecting one or more carbon nanotubes having a predetermined width from the array of carbon nanotubes; and S32b: pulling the carbon nanotubes to obtain carbon nanotube segments at an even/uniform speed to achieve a uniform carbon nanotube film.

In step S32b, the carbon nanotube segment includes a number of substantially parallel carbon nanotubes. The carbon nanotube segments can be selected by using an adhesive tape as the tool to contact the super-aligned array of carbon nanotubes. The pulling direction can be substantially perpendicular to the growing direction of the super-aligned array of carbon nanotubes. More specifically, during the pulling process, as the initial carbon nanotube segments are drawn out, other carbon nanotube segments are also drawn out end to end due to van der Waals force between ends of adjacent segments. This process of pulling produces a substantially continuous and uniform carbon nanotube film having a predetermined width can be obtained.

In step S40, A method for forming the second plating film includes the following sub-steps:

S41, providing an active metal plate used as a counter electrode, and using the structure formed in step S30 as a working electrode;

S42, providing a certain voltage between the structure formed in step S30 and the active metal plate to form the second plating film.

During the electroplating process, active metal ions in the salt solution of active metal get electrons to form active metal atoms. A large number of active metal atoms are deposited on the surface of the carbon nanotube structure, and a small number of active metal atoms can be deposited into the micropores between adjacent carbon nanotubes in the carbon nanotube structure.

The composite structure includes the first plating film, the carbon nanotube structure and the second plating film, which are stacked with each other. Further, a plurality of composite structures can be formed by repeating step S10 to S40. The plurality of composite structures are stacked. The first plating film is formed on the second plating film, and the carbon nanotube structure is located on the first plating film, and the second plating film is formed on the carbon nanotube structure. An arrange direction of the carbon nanotubes in the carbon nanotube structure can be selected according to practical needs.

In step S50, the process of annealing the composite structure at high temperature comprises: heating the composite structure at a high temperature to melt the first plating film and the second plating film, which the inert metal atoms in the first plating film are mixed with the active metal atoms in the second plating film to form a middle structure; then annealing and cooling the middle structure to form an alloy of the active metal and the inert metal. The preform structure includes an alloy of the active metal and the inert metal and the carbon nanotube structure. The alloy of the active metal and the inert metal is located on the surface of the carbon nanotubes and the micropores of adjacent carbon nanotubes in the carbon nanotube structure. Further, the alloy of the active metal and the inert metal is located in the nodes of the carbon nanotubes joined end to end therebetween.

Different metal materials have different annealing temperature. The annealing temperature can be controlled according to the type of the metal materials. By controlling the annealing temperature different metal atoms can be fully diffused. During the process of high temperature annealing, both the inert metal and active metal grow directly on the carbon nanotubes to reduce the contact resistance between the carbon nanotube structure and the alloy of the inert metal and active metal. An interface between the carbon nanotubes and the alloy is a coherent interface. The annealing temperature is equal to or greater than 300° C. In one embodiment, the annealing temperature is about 450° C.

Figure 4A:
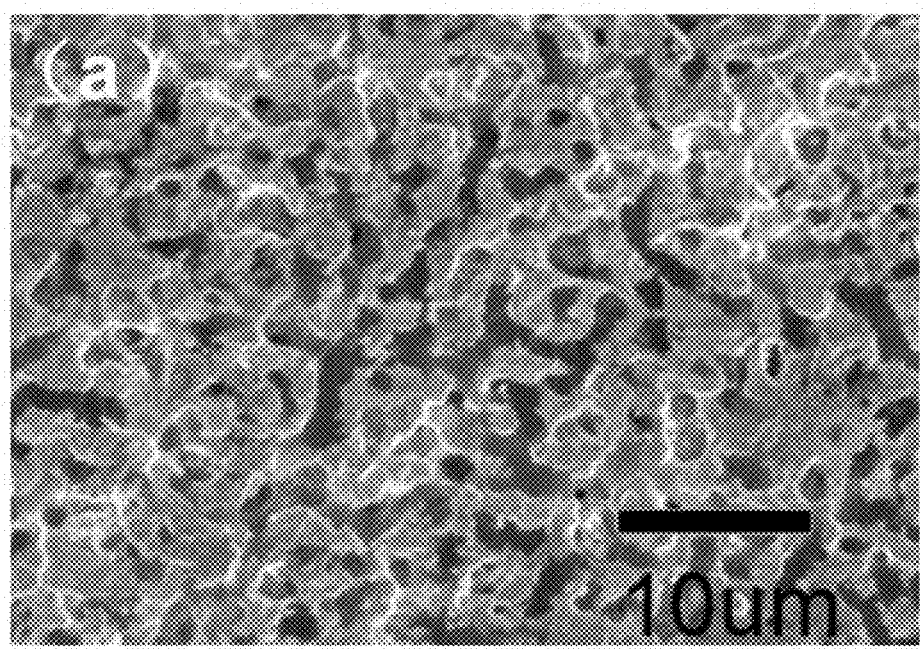
FIG. 4a is a Scanning Electron Microscope (SEM) image of three-dimensional porous composite structure obtained by chemical corrosion of 0.05 g/L dilute hydrochloric acid.
Figure 4B:
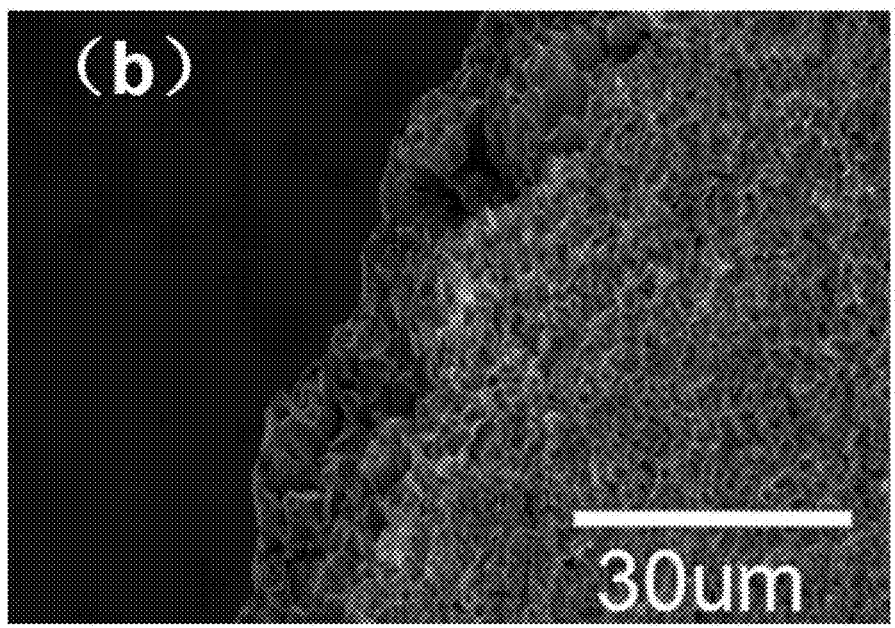
Figure 5:
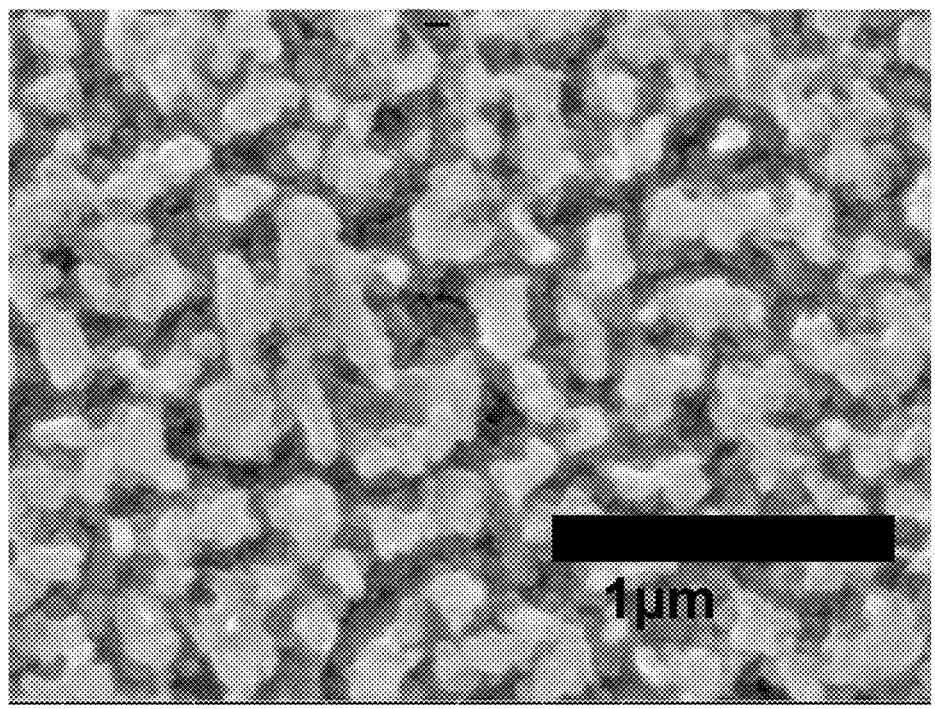
FIG. 5 is a Scanning Electron Microscope (SEM) image of the three-dimensional porous composite structure obtained by electrochemical corrosion of 0.05 g/L dilute hydrochloric acid.

In step S60, referring to FIG. 4a, FIG. 4b and FIG. 5, the method for etching the preform structure can be electrochemical corrosion or chemical corrosion. The preform structure is immersed in a dilute acid solution or dilute alkali solution. A plurality of pores are formed in the preform structure, due to the active metal in the preform structure occur chemical reaction with the dilute acid solution or dilute alkali solution.

In one embodiment, an electrochemical corrosion method is used to etch the preform structure, in which the size of pores can be easily controlled. The size and distribution rate of the pores are determined by a ratio of active metal to inert metal, dilute acid concentration, dilute alkali concentration and length of etching time. The longer the etching time, the larger the size of pores. In another embodiment, the dilute acid solution is dilute hydrochloric acid, and the weight concentration of the dilute hydrochloric acid is 0.05 mol/L. The size of pores is about 1 μm.

Figure 6:
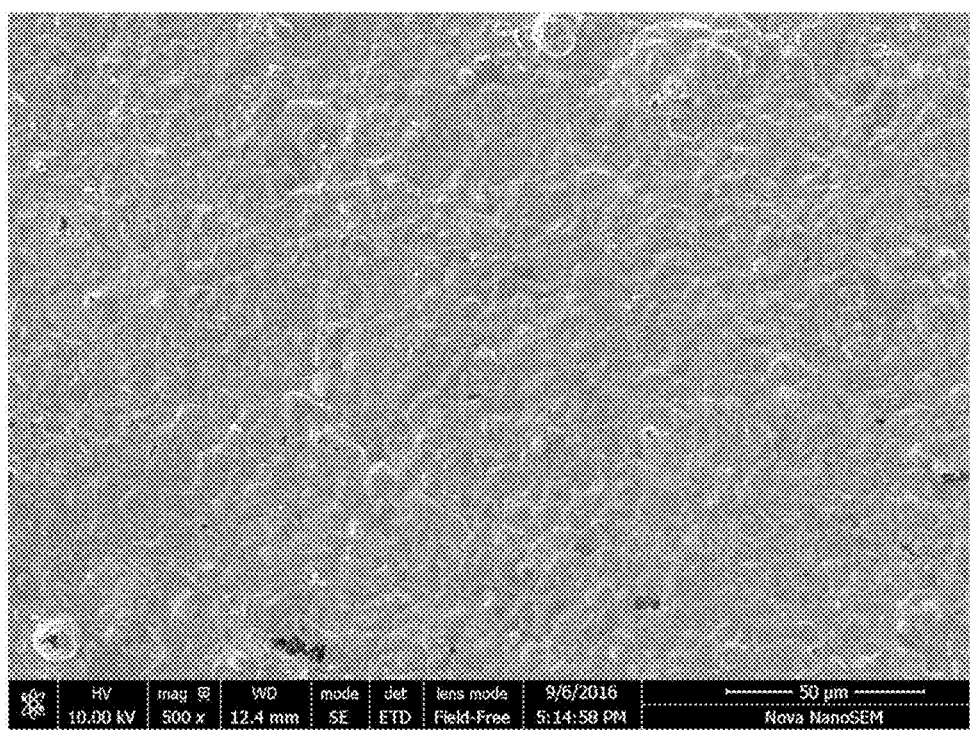
FIG. 6 is a Scanning Electron Microscope (SEM) image of the three-dimensional porous composite structure at a low magnification.
Figure 7:
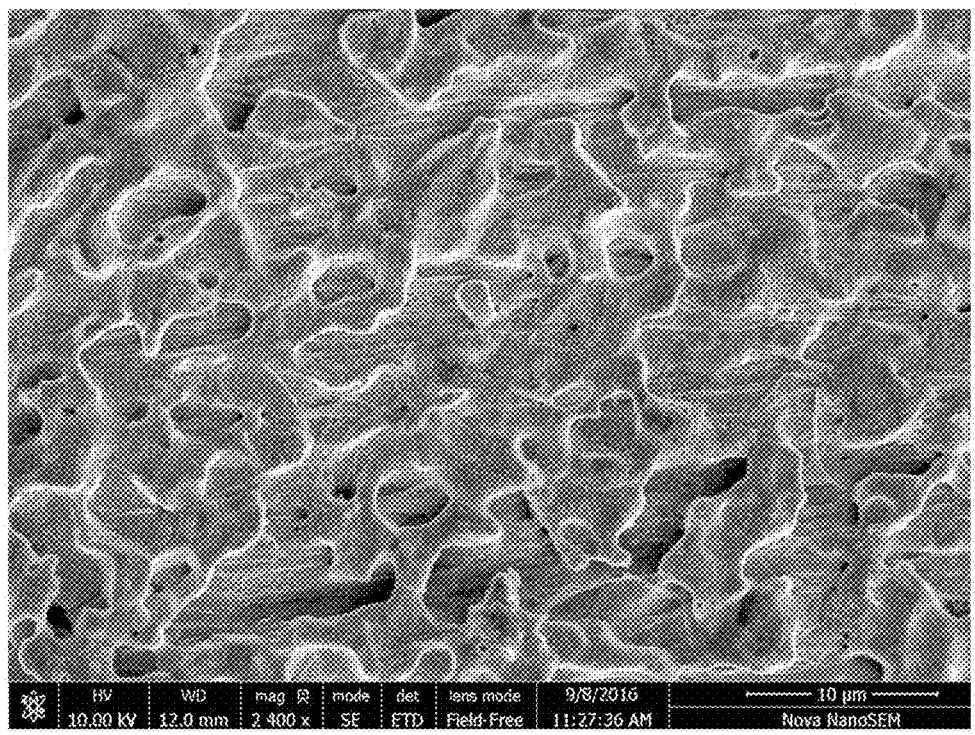
FIG. 7 is a Scanning Electron Microscope (SEM) image of the three-dimensional porous composite structure obtained by chemical corrosion of 0.05 g/L dilute hydrochloric acid for fifteen hours.

After etching the preform structure, a plurality of pores are formed in the preform structure. The three-dimensional porous composite structure is shown in FIG. 6 and FIG. 7. One part of carbon nanotube can be exposed through the plurality of pores, and another part of carbon nanotube can be located in the plurality of pores, and/or the others part of carbon nanotube can be covered with the inert metal.

The method for making the three-dimensional porous composite structure provided by above embodiment, a de-alloying technology is used to obtain the three-dimensional porous composite structure, a plurality of carbon nanotubes are embedded in the metal ligaments to improve conductivity, mechanical strength and stability of the three-dimensional porous composite structure, meanwhile increases the specific surface area of the three-dimensional porous composites; the interface between carbon nanotubes and inert metal is a coplanar interface, which eliminate the contact resistance between carbon nanotubes and inert metals, and further improve conductivity of the three-dimensional porous composite structure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making a three-dimensional porous composite structure comprising:
    S10, providing a salt solution of an inert metal and a salt solution of an active metal;
    S20, forming a first plating film by electroplating the salt solution of inert metal on a substrate;
    S30, placing a carbon nanotube structure on the first plating film;
    S40, forming a second plating film by electroplating the salt solution of active metal on the carbon nanotube structure; and removing the substrate to obtain a composite structure;
    S50, annealing the composite structure formed in the step S40 at a high temperature to obtain a preform structure; and
    S60, etching the preform structure to obtain a three-dimensional porous composite structure.

2. The method of claim 1, wherein a plurality of composite structure are obtained, the plurality of composite structure are stacked with each other.

3. The method of claim 1, wherein the carbon nanotube structure comprises at least one carbon nanotube film, the at least one carbon nanotube film comprises a plurality of successive and oriented carbon nanotubes joined end-to-end by van der Waals force therebetween.

4. The method of claim 3, wherein a method for making the carbon nanotube film comprises:
    S31: providing an array of carbon nanotubes; and
    S32: pulling out at least one carbon nanotube film from the carbon nanotube array.

5. The method of claim 4, wherein the carbon nanotube array comprises a plurality of carbon nanotubes, the plurality of carbon nanotubes are substantially parallel with each other and perpendicular to a growing substrate.

6. The method of claim 3, wherein the carbon nanotube structure comprises a plurality of carbon nanotube films, the plurality of carbon nanotube films can be coplanar or stacked.

7. The method of claim 6, wherein an angle between adjacent carbon nanotube films is ranged from 0° to 90°.

8. The method of claim 1, wherein a process of annealing the composite structure at high temperature comprises:

heating the composite structure at a high temperature to melt the first plating film and the second plating film, the inert metal atoms in the first plating film are mixed with the active metal atoms in the second plating film to form a middle structure; and annealing and cooling the middle structure to form an alloy of the active metal and the inert metal.

9. The method of claim 1, wherein the high temperature is equal to and greater than 300° C.

10. The method of claim 1, wherein a method for etching the preform structure comprises: immersing the preform structure into a dilute acid solution or dilute alkali solution for electrochemical corrosion or chemical corrosion.

11. The method of claim 10, wherein the dilute acid solution is dilute hydrochloric acid, and a weight concentration of the dilute hydrochloric acid is 0.05 mol/L.

12. The method of claim 1, wherein the three-dimensional porous composite structure defines a plurality of pores, wherein a size of the plurality of pores is less than or equal to 100 μm.

13. The method of claim 12, wherein a size of the plurality of pores is about 1 μm.

* * * * *